Patented Apr. 2, 1946

2,397,727

UNITED STATES PATENT OFFICE 2,397,727

ORGANO-SILOXANES AND METHODS OF MAKING THEM

William Herbert Daudt, Corning, N. Y., assignor to Corning Glass Works, Corning, N. Y., a corporation of New York No Drawing. Application March 30, 1943, Serial No. 481,151

11 Claims. (Cl. 260—2)

This invention relates to new compositions of matter, their preparation and uses and, more particularly, to organo-siloxanes and methods of preparing them.

My invention is directed to the interaction of two or more different organo-silicon oxide polymers and to the products derived therefrom. Organo-siloxanes are compounds which contain organic radicals attached to silicon through carbon atoms and whose silicon atoms are linked to other silicon atoms by oxygen atoms, thus Si-O-Si. They may be prepared by the hydrolysis of hydrolyzable organo-silicanes and condensation of the hydrolysis products. Furthermore, hydrolysis of a mixture of different hydrolyzable organo-silicanes and co-condensation of the hydrolysis products produces organo-siloxanes which are within the scope of my invention. In the latter case, a hydrolyzable silicane which contains no organic radicals attached to silicon through a carbon atom, such as silicon tetrachloride or ethyl orthosilicate, may be included along with the hydrolyzable organo-silicanes. By hydrolyzable organo-silicanes I mean derivatives of $SiH_4$ which contain from 1 to 3 readily hydrolyzable radicals such as halogens, amino groups, alkoxy and acyloxy radicals, etc., the remaining valences of the silicon atoms being satisfied by organic radicals that are joined to the silicon atoms through carbon atoms, such as alkyl, substituted alkyl, aryl, substituted aryl radicals, etc.

Hydrolysis of the above silicanes or mixtures thereof is generally accompanied by condensation to a greater or less degree depending upon the conditions of hydrolysis and the particular silicanes involved. As a result of the hydrolysis and concurrent condensation, organo-siloxanes are produced which are partially or completely condensed and which have on the average up to and including three organic radicals attached to each silicon atom. The polymers so obtained vary in character, some being oily liquids, others being crystalline solids or gels. They also vary in the ease with which they may be further polymerized since they differ in the number of active functional groups retained as a result of incomplete hydrolysis and condensation. Those which are only partially condensed may be converted to higher polymers and even to solids by heat alone or even by standing at room temperature by virtue of the completion of condensation. On the other hand, those organo-siloxanes which approach complete condensation are extremely resistant to further polymerization by heat alone. These substantially completely condensed polymers are not limited to those which are of high molecular weight but may be polymers of low molecular weight as well. For example, the condensed hydrolysis products of the di-organo-substituted silicanes are essentially completely condensed even in the low polymeric stages and exist generally as liquids in the trimeric form.

Various methods have been recently provided for polymerizing the organo-siloxanes to higher polymeric materials which have been found to have properties that render them extremely useful industrially. However, while it is possible to vary the properties of the higher polymers so obtained by varying the conditions and extent of polymerization, the amount of variation is limited by the kind and number of organic radicals present in a given polymer or copolymer. Accordingly, it is desirable to produce organo-siloxanes from two or more of the above described siloxanes whereby greater opportunity for obtaining a polymeric composition of certain desired properties would be provided.

In the co-pending application of James Franklin Hyde, Serial Number 432,528, filed February 26, 1942, and assigned to the assignee of the present invention, the preparation of organo-siloxanes by the copolymerization of two or more different hydrolyzable organo-silicanes by cohydrolyzing and co-condensing the compounds in the desired proportions is described. An inherent disadvantage of this method is the sensitiveness of the hydrolyzable silicanes to moisture so that they are difficult to handle and to store indefinitely without undergoing change. On the other hand, the condensed hydrolysis products of the silicanes or mixtures thereof and the substances obtained therefrom by polymerization are not subject to this disadvantage and, hence, are to be preferred as starting materials. However, in order for these condensed hydrolysis products, particularly those which are substantially completely condensed, to participate effectively in any copolymerization it is necessary to rupture linkages present in these compounds in order to bring about extensive interlinking between the polymers. Furthermore, it has been found that some of the condensed hydrolysis products, particularly when polymerized to higher polymers, are incompatible or immiscible so that their interaction in such cases is rendered even more difficult.

One of the objects of my invention is to provide a method of inter-acting two or more different organo-siloxanes.

A further object of my invention is to provide a method of inter-acting two or more different organo-siloxanes which are substantially free of active functional groups.

Another object of my invention is to provide a method of inter-acting two or more different organo-siloxanes which are immiscible.

Another object of my invention is to provide a method of inter-acting two or more different organo-silicon compounds selected from the group consisting of the condensed hydrolysis products of hydrolyzable organo-silicanes or mixtures thereof and higher polymers of the condensed hydrolysis products.

Still another object of my invention is to prepare new organo-siloxanes from two or more different organo-silicon compositions selected from the group consisting of the condensed hydrolysis products of hydrolyzable organo-silicanes or mixtures thereof and higher polymers of the condensed hydrolysis products.

In accordance with my invention, I have provided a method of inter-acting two or more different organo-siloxanes which comprises mixing them and heating them at a temperature below their decomposition points while concurrently subjecting the entire body of the mixture to intimate contact with air. I prefer to blow the air through the mixture but other means may be employed, if desired, for providing intimate contact of the mixture with the air, such as countercurrent flow through a tower. I also prefer to heat the mixture at a temperature between about 100° C. and about 250° C. I have found that by such treatment even organo-siloxanes which initially are immiscible combine to form homogeneous compositions. Furthermore, liquid products are obtained which possess desirable properties in many respects superior to those of the individual starting materials. These products are themselves capable of being further polymerized. For example, upon continued intimate contact with air at elevated temperatures, they increase in viscosity and may be finally converted to insoluble and infusible resins. It is to be understood that by inter-action is meant the interlinking of two differently substituted molecules and not the subsequent polymerization of the product which may be accomplished in several ways.

It is believed that the inter-action effected in the above manner takes place by a redistribution of Si-O-Si linkages in the presence of the oxygen of the air at elevated temperatures and also by formation of new linkages between silicon atoms from which organic substituents are removed by oxidation. Another theory is that rearrangement of Si-O-Si linkages occurs after intermediate peroxides have been formed by association of the organo-silicon compounds with traces of oxygen. However, whatever the mechanism may be, I have made it possible by this air blowing method to employ previously hydrolyzed and condensed organo-silicon compounds as starting materials for forming organo-siloxanes with different kinds and proportions of organic radicals with consequent control over the properties of the resulting products.

For a better understanding of my invention, reference should be had to the following examples.

Example 1

A mixture of polymeric phenyl ethyl silicone and polymeric dimethyl silicone, in the equivalent ratio of 1:2 respectively, was heated at about 250° C. and blown with a steady stream of air. The dimethyl silicone employed in this and the following examples had been prepared by strong acid hydrolysis of dimethyldiethoxysilicane. It was an oil of about 2000 Saybolt seconds and was immiscible with phenyl ethyl silicone which had been prepared by the hydrolysis and condensation of phenyl ethyl silicon dichloride. Ordinarily, the dimethyl silicone would have become an insoluble gel after about one-half hour of air blowing at 250° C. However, no gelation occurred in the above mixture even after 12 hours of air blowing. Instead, the two materials became miscible and homogeneous at 250° C., although the mixture was still slightly turbid when cold. After being blown with air for 20 hours under the conditions just stated, the product was very viscous at 250° C. and remained clear even in the cold thus demonstrating that inter-action had been effected. The product was applied to glass tape for the purpose of filling the interstices of the latter and the impregnated tape was then heated in an oven at 250° C. for 14 hours whereby the product was converted to a solid resin.

Example 2

The procedure given in Example 1 was applied to a mixture of the same starting materials in the molar ratio of 1:1. The mixture became extremely viscous and somewhat rubbery in consistency after 19 hours of blowing while hot with air but was still benzene soluble. Upon cooling, no layers separated, thereby indicating that inter-action had taken place. When a sample of the air-blown material was applied to a glass plate and to glass tape and baked for 35 hours at 250° C., a soft and flexible resin was obtained which was nearly clear.

Example 3

The procedure given in Example 1 was applied to a mixture of the same starting materials in the molar ratio of 2:1. The same behavior was observed but a somewhat tougher resin was obtained after baking.

Example 4

A mixture of the dimethyl silicone having a viscosity of 2100 Saybolt seconds and phenyldimethylsilicyl oxide in the molar ratio of about 10:1 was air-blown for 6½ hours at 230° C. An oil was produced which was not as viscous as the starting dimethyl silicone. When cooled below −20° C. it exhibited a rubbery consistency.

In addition to the above examples, various mixtures of diamyl silicone with phenyl ethyl silicone, of diamyl silicone with phenyl methyl silicone and of dimethyl silicone with phenyl methyl silicone were air-blown until inter-action took place and were then polymerized by further air-blowing to extremely viscous materials which were readily convertible by heat to solid resins. The liquid condensed hydrolysis products of methyltriethoxysilicane, ethyltriethoxysilicane, and amyltriethoxysilicane may be copolymerized by my method with the above mentioned di-organo-substituted silicones and with the tri-organo-substituted silicyl ethers. Copolymers containing on the average of from less than one up to nearly three organic radicals per silicon atom have been inter-acted in accordance with my invention. These copolymers were prepared by the cohydrolysis and co-condensation of mixtures of differently substituted hydrolyzable silicanes obtained directly as mixtures from the Grignard reaction of an organo-magnesium halide on silicon tetrachloride or ethyl ortho-silicate or prepared by mixing different silicanes to give mixtures of desired constituents in predetermined quantities. Among the silicanes employed to accomplish the latter were silicon tetrachloride, ethyl orthosilicate, methyltriethoxysilicane, dimethyldiethoxysilicane, trimethylethoxysilicane, phenyldimethylethoxysilicane, phenylmethyldiethoxysilicane, phenyl silicon trichloride, diphenyldiethoxysilicane, ethyltriethoxysilicane, diethyl silicon dichloride, phenyl ethyl silicon dichloride, diphenyl ethyl silicon chloride, butyltriethoxysilicane, dibutyldiethoxysilicane, benzyltriethoxysilicane, dibenzyldiethoxysilicane and others. Mixtures containing more than two silicones have also been inter-acted by my method.

In view of the above examples it is clear that inter-action of two or more different organo-siloxanes may be accomplished by air-treating the mixture in accordance with my invention. It is further evident that the method is applicable whether the compounds are miscible or immiscible. Besides the organic radicals disclosed in the above examples other radicals may be attached directly to silicon atoms through carbon atoms such as propyl, isopropyl, isobutyl, hexyl, heptyl to octadecyl and higher; alicyclic radicals such as mono- and poly-alkyl phenyls as tolyl, xylyl, mesityl, mono-, di-, and tri-propyl phenyls, etc.; naphthyl, mono- and poly-alkyl naphthyls as methyl naphthyl, diethyl naphthyl, tri-propyl naphthyl, etc.; tetra-hydro-naphthyl; anthracyl, etc.; aralkyl such as phenylethyl, etc.; alkenyl such as methallyl, allyl, etc.

The products prepared in the manner described in the above examples may be used for a variety of purposes. For example, when polymerized further to a heat-convertible state as by further air-blowing they may be used as coating and impregnating agents, particularly in the fabrication of electrical insulating materials, because in the heat-convertible stage they can be dissolved and applied in the form of solutions for the impregnation of various fibrous materials and thereafter can be further polymerized to complete insolubility and infusibility. In the latter state they have good mechanical characteristics and good electrical properties at room temperature, all of which are retained at temperatures above those at which prior coating materials break down and deteriorate.

In addition to the use of the new products in the field of electrical insulation, there are many others for which these polymers are eminently adapted. They may be used as hydraulic fluids, liquid insulating media, thermal expansion fluids, waterproofing agents, etc. Their resistance to high temperature, their electrical properties, low freezing points and high boiling points adapt them to many diversified industrial applications.

I claim:

1. In the method of preparing new synthetic compositions from liquid organo-siloxanes whose organic substituents comprise essentially monovalent hydrocarbon radicals attached to silicon through carbon-silicon linkages, at least some of the hydrocarbon radicals being alkyl radicals, the steps comprising mixing two of said organo-siloxanes which are immiscible at room temperature, blowing air through the resulting mixture while concurrently heating the mixture to reaction temperature to effect inter-action of said organo-siloxanes.

2. In the method of preparing new synthetic compositions from liquid organo-siloxanes whose organic substituents comprise essentially monovalent hydrocarbon radicals attached to silicon through carbon-silicon linkages, at least some of the hydrocarbon radicals being alkyl radicals, the steps comprising mixing two of said organo-siloxanes which are immiscible at room temperature, blowing oxygen through the resulting mixture while concurrently heating the mixture to reaction temperature to effect inter-action of said organo-siloxanes.

3. The method which comprises mixing a liquid organo-siloxane whose structural unit corresponds substantially to the formula $R_2SiO$ and a liquid organo-siloxane whose structural unit corresponds substantially to the formula $R'R''SiO$, where R and R' are lower alkyl radicals and R'' is a phenyl radical, said organo-siloxanes being immiscible at room temperature blowing air through the resulting mixture while concurrently heating the mixture to reaction temperature to effect inter-action of said organo-siloxanes.

4. The method which comprises mixing a liquid polymeric phenyl ethyl silicone and a liquid polymeric dimethyl silicone having a viscosity of about 2000 Saybolt seconds, heating the mixture at about 250° C. while blowing a stream of air therethrough, and continuing said heating and air-blowing for at least 20 hours.

5. In the method of preparing new synthetic compositions from liquid organo-siloxanes whose organic substituents comprise essentially monovalent hydrocarbon radicals attached to silicon through carbon-silicon linkages, at least some of the hydrocarbon radicals being alkyl radicals, the steps comprising mixing two of said organo-siloxanes which are immiscible at room temperature and which are completely dehydrated prior to mixing, blowing air through the resulting mixture while concurrently heating the mixture to reaction temperature to effect interaction of said organo-siloxanes.

6. In the method of preparing new synthetic compositions from liquid organo-siloxanes whose organic substituents comprise essentially monovalent hydrocarbon radicals attached to silicon through carbon-silicon linkages, at least some of the hydrocarbon radicals being alkyl radicals, the steps comprising mixing two of said organo-siloxanes which are immiscible at room temperature, blowing air through the resulting mixture while concurrently heating the mixture to reaction temperature to effect interaction of said organo-siloxanes, and continuing the air-blowing and heating until a product is obtained which is a homogeneous liquid at room temperature.

7. In the method of preparing new synthetic compositions from liquid organo-siloxanes whose organic substituents comprise essentially monovalent hydrocarbon radicals attached to silicon through carbon-silicon linkages, at least some of the hydrocarbon radicals being alkyl radicals, the steps comprising mixing two of said organo-siloxanes which are immiscible at room temperature, blowing air through the resulting mixture while concurrently heating the mixture at a temperature between about 100° C. and about 250° C.

8. The method which comprises mixing a liquid organo-siloxane whose structural unit corresponds substantially to the formula $R_2SiO$ and a liquid organo-siloxane whose structural unit corresponds substantially to the formula $R'R''SiO$, where R and R' are lower alkyl radicals and R'' is an aryl radical, said organo-siloxanes being immiscible at room temperature and being completely dehydrated prior to mixing, blowing air through the resulting mixture while concurrently heating the mixture to reaction temperature to effect interaction of said organo-siloxanes.

9. The method which comprises mixing a liquid organo-siloxane whose structural unit corresponds substantially to the formula $R_2SiO$ and a liquid organo-siloxane whose structural unit corresponds substantially to the formula $R'R''SiO$, where R and R' are lower alkyl radicals and R'' is an aryl radical, said organo-siloxanes being immiscible at room temperature, blowing air through the resulting mixture while concurrently heating the mixture to reaction temperature to effect interaction of said organo-siloxanes, and continuing the air-blowing and heating until a product is obtained which is a homogeneous liquid at room temperature.

10. The method which comprises mixing a liquid organo-siloxane whose structural unit corresponds substantially to the formula $R_2SiO$ and a liquid organo-siloxane whose structural unit corresponds substantially to the formula $R'R''SiO$, where R and R' are lower alkyl radicals and R'' is an aryl radical, said organo-siloxanes being immiscible at room temperature, blowing air through the resulting mixture while concurrently heating the mixture at a temperature between about 100° C. and about 250° C.

11. The method which comprises mixing a liquid organo-siloxane whose structural unit corresponds substantially to the formula $(CH_3)_2SiO$ and a liquid organo-siloxane whose structural unit corresponds substantially to the formula $(C_6H_5)(C_2H_5)SiO$, said organo-siloxanes being immiscible at room temperature, blowing air through the resulting mixture while concurrently heating the mixture to reaction temperature to effect interaction of said organo-siloxanes.

WILLIAM HERBERT DAUDT.